United States Patent [19]

Pollman et al.

[11] Patent Number: 4,462,210
[45] Date of Patent: Jul. 31, 1984

[54] INPUT TORQUE CONTROL FOR A VARIABLE DISPLACEMENT HYDRAULIC TRANSMISSION

[75] Inventors: Frederic W. Pollman; Jimmy W. Bolinger, both of Ames; David W. Reynolds, Huxley, all of Iowa

[73] Assignee: Sundstrand Corporation, Rockford, Ill.

[21] Appl. No.: 288,988

[22] Filed: Jul. 31, 1981

[51] Int. Cl.³ .............................................. F16H 39/46
[52] U.S. Cl. ....................................... 60/444; 60/445; 60/465
[58] Field of Search ................. 60/443, 444, 445, 449, 60/465

[56] References Cited

U.S. PATENT DOCUMENTS

| 2,393,882 | 1/1946 | Blair | 60/19 |
|---|---|---|---|
| 2,658,343 | 11/1953 | McGill | 60/53 |
| 3,003,309 | 10/1961 | Bowers et al. | 60/19 |
| 3,199,793 | 8/1965 | Sabi | 60/445 X |
| 3,213,617 | 10/1965 | Hallberg | 60/53 |
| 3,230,699 | 1/1966 | Hann et al. | 60/19 |
| 3,371,479 | 3/1968 | Yapp et al. | 60/19 |
| 3,583,154 | 6/1971 | Utter | 60/19 |
| 3,716,987 | 2/1973 | Lonnemo | 60/19 |
| 3,751,903 | 8/1973 | Bauchet et al. | 60/19 |
| 3,864,912 | 2/1975 | Othen et al. | 60/431 |
| 3,871,177 | 3/1975 | Ridlen | 60/431 |
| 3,884,038 | 5/1975 | Forster et al. | 60/431 |
| 3,969,896 | 7/1976 | Louis | 60/431 |
| 4,041,702 | 8/1977 | Habiger | 60/445 X |
| 4,091,617 | 5/1978 | Cornell | 60/445 |

FOREIGN PATENT DOCUMENTS

| 1025068 | 4/1966 | United Kingdom . |
|---|---|---|
| 1482947 | 8/1977 | United Kingdom . |
| 2025583 | 1/1980 | United Kingdom | 60/449 |

Primary Examiner—Edward K. Look
Attorney, Agent, or Firm—Wood, Dalton, Phillips, Mason & Rowe

[57] ABSTRACT

A torque control for a drive system having a hydraulic transmission connectable to a prime mover (30) and having a pair of hydraulically-connected displacement devices V and F, with one device having variable displacement, a torque sensor (35) generates a torque signal representative of prime mover output torque in either driving or braking mode, torque demand generators (47,47') generate a torque demand signal selectively in either driving or braking modes, a governor valve (63) compares the torque signals and generates a control signal and a control servo 17, responsive to the control signal, controls the displacement of the variable displacement device V to eliminate any difference in torque signals.

10 Claims, 2 Drawing Figures

INPUT TORQUE CONTROL FOR A VARIABLE DISPLACEMENT HYDRAULIC TRANSMISSION

DESCRIPTION

1. Technical Field

This invention relates to input torque controls for a variable displacement hydraulic transmission and, more specifically, a hydrostatic transmission.

2. Background Art

Variable displacement hydraulic transmissions are used in vehicle drives. Various systems are known for limiting torque to prevent overloading of an internal combustion engine beyond a predetermined threshold value. Additionally, it is known to have a proportioning torque control for a transmission used in vehicle driving wherein the prime mover is an internal combustion engine and the control provides for variations in both engine torque and engine speed, whereby the control of fuel to the engine and, therefore, control of engine speed is responsive to torque demand as well as the displacement of the transmission. The prior art systems have not relied upon control, only, of the transmission ratio of the transmission with torque-dependent horsepower signals to accomplish normal driving of a vehicle.

DISCLOSURE OF INVENTION

The present invention is directed to an input torque control which proportions the torque of the prime mover in response to an operator torque demand signal.

One object of the invention is to provide an input torque control for a drive mechanism which controls only the transmission ratio of the hydraulic transmistion and is operative in driving and braking modes.

According to the present invention, a torque control for a drive system having a fixed speed prime mover connected to a hydraulic transmission having a pair of hydraulically-connected displacement devices with at least one of said devices having variable displacement, comprises a torque signal generator which generates a signal representative of prime mover output torque, a torque demand generator which generates a signal indicating operator torque demand, a comparing device which compares said torque signals and generates a control signal, and a displacement control for the variable displacement device responsive to the control signal for controlling displacement of the variable displacement device in response to comparison of said torque signals.

The torque control enables operator torque demand to accomplish normal driving and braking of a vehicle utilizing an hydraulic transmission by a pair of torque demand generators selectively operable by an operator in driving and braking, respectively, and a torque signal generated as representative of prime mover output torque can be either a positive signal in a driving mode or a negative signal in the braking mode of operation and a comparing device compares the output torque signal with the torque demand signal and provides a control signal for the variable displacement device in either a driving or braking mode.

Another object of the invention is to provide an input torque control for a variable displacement hydraulic transmission, as defined in the preceding paragraphs.

A further object of the invention is to provide an input torque control for a variable displacement hydraulic transmission wherein normal driving and braking can be operator-controlled solely through torque demand signals for controlling the displacement of the transmission with the prime mover for the transmission having a fixed speed and not subject to control and wherein the maximum value of said first and second torque demand signals can be limited.

BEST MODE FOR CARRYING OUT THE INVENTION

Figure 1:
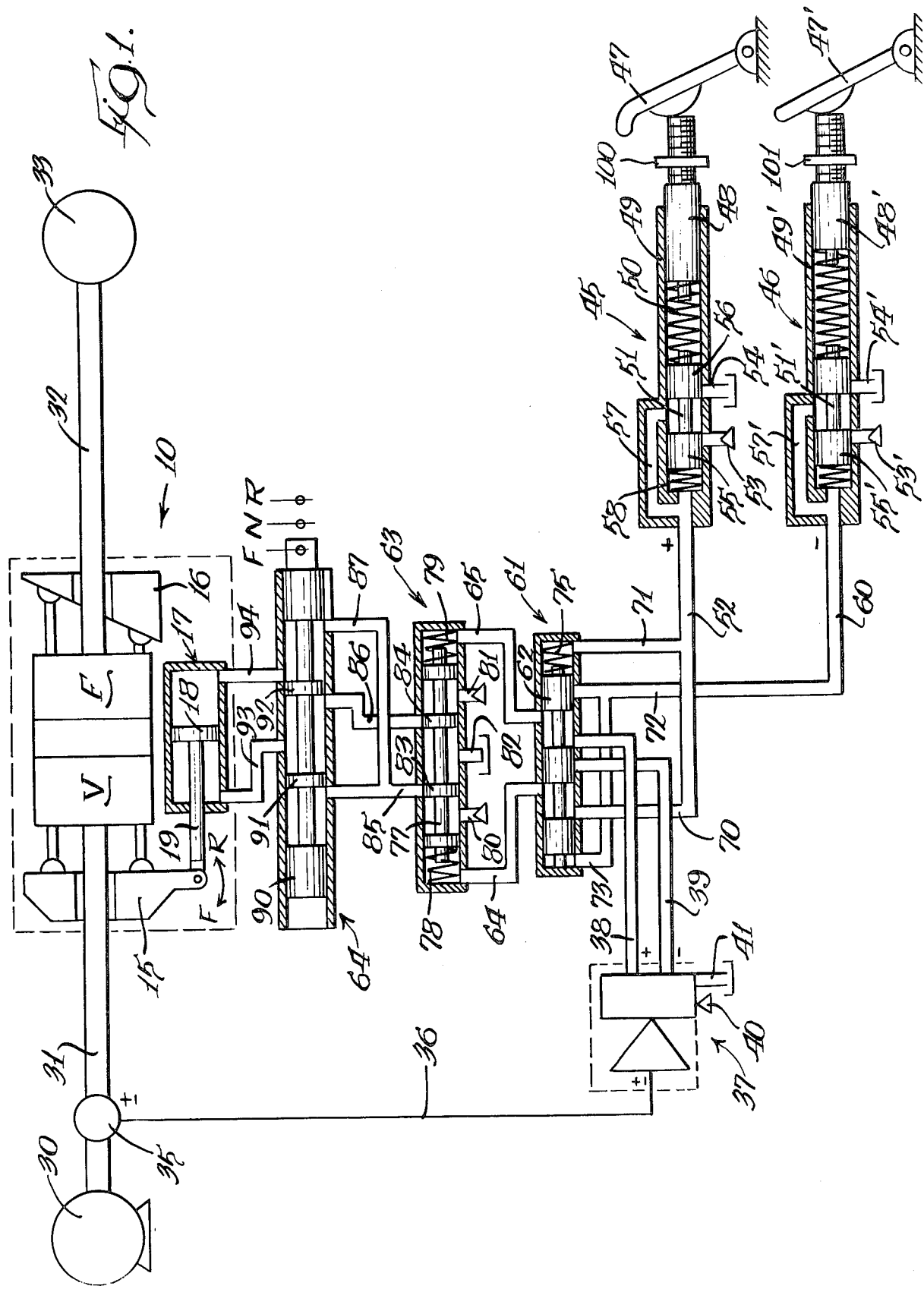
FIG. 1 is a schematic drawing of the input torque control for a variable displacement hydraulic transmission.

The input torque control for a variable displacement hydraulic transmission is shown in the schematic drawing of FIG. 1. The hydraulic transmission is indicated generally at 10 and, more particularly, is a hydrostatic transmission of a conventional type wherein a pair of axial piston displacement devices, identified at V and F, are hydraulically interconnected. Each of these devices has a rotatable member with axially movable pistons with the stroke thereof during rotation of the rotatable members being under the control of a pair of swash plates 15 and 16, respectively. The displacement device V has variable displacement by the swash plate 15 being movable to different positions of inclination to either side of a neutral position under the control of a servo in the form of a double-acting cylinder 17. The cylinder 17 has a piston 18 connected by means of a rod 19 to the movable swash plate 15.

Figure 2:
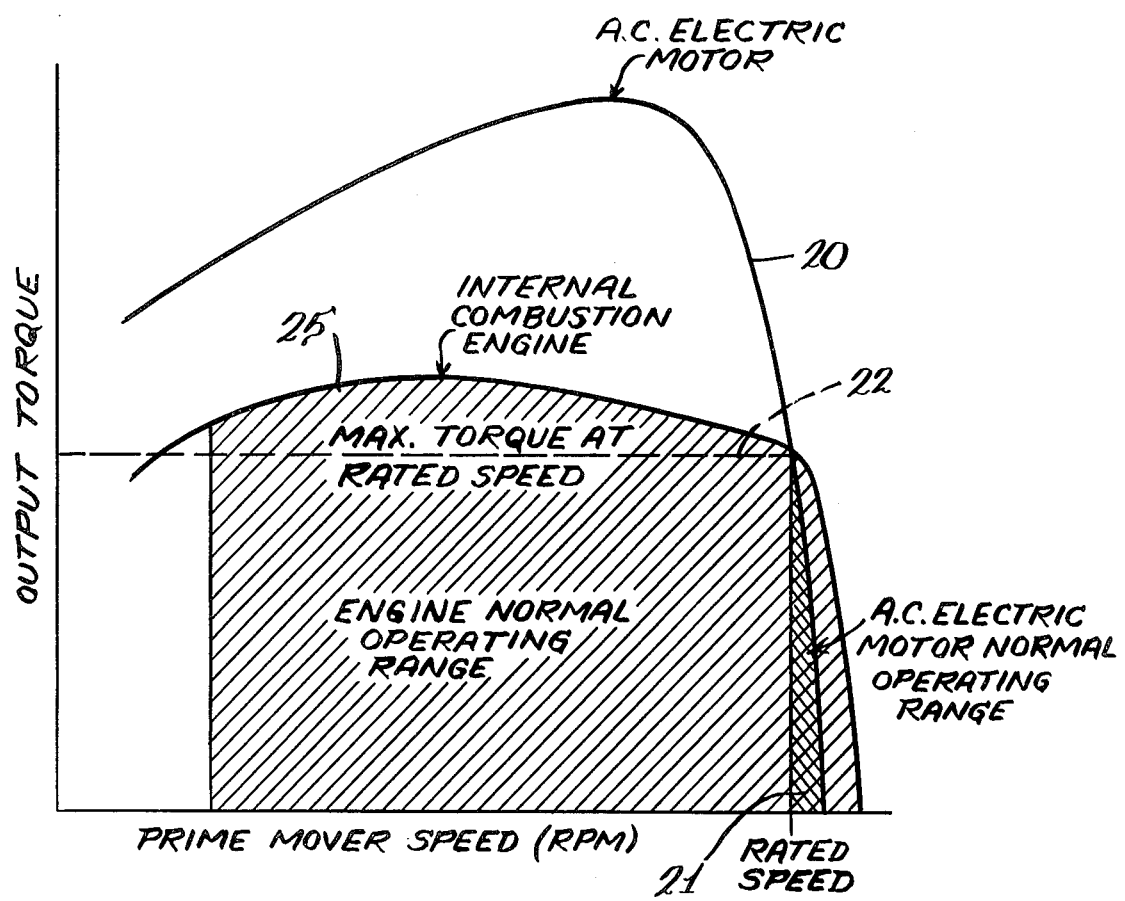
FIG. 2 is a graph of typical torque vs. speed curves.

In considering the input torque control, reference is first made to the torque vs. speed curves shown in the graph of FIG. 2. Prime mover speed is plotted as the abscissa and output torque as the ordinate. The line 20 represents a typical output torque-speed relation of an AC electric motor wherein the output torque has relatively large and undesirable torque variations when the motor speed varies. A cross-hatched area 21 indicates normal operating range of the motor and with a broken line 22 indicating maximum torque at rated speed. As the output speed and torque requirements of a transmission vary, transmission ratio must change to accommodate prime mover speed and output torque limitations. With the prime mover having a relatively fixed output speed, such as an electric motor, the transmission ratio change must be sensitive to the output torque of the prime mover in order to prevent an overload condition.

The line 25 represents the output torque with respect to speed for a typical internal combustion engine and it will be seen that the prime mover has a relatively constant, but limited, output torque as output speed is varied.

Referring again to FIG. 1, the hydraulic transmission variable displacement unit V is driven by a prime mover and, specifically, a prime mover having a fixed speed, such as an AC electric motor and identified at 30, which, through a drive connection 31, drives the displacement unit V. The output of the transmission is from the other displacement unit F which, by a drive connection 32, drives a driven mechanism, such as the drive wheels of a vehicle, as indicated at 33.

A torque sensor 35, associated with the prime mover 30 measures output torque of the prime mover and, thus, input torque to the hydraulic transmission and has a bidirectional output indicating that the hydraulic transmission is in either a driving or a braking mode. When the transmission is in a driving mode, the prime mover is delivering power to the hydraulic transmission while, in a braking mode, the prime mover 30 is resisting rotation of the variable displacement device V.

The torque sensor 35 can be one of many several different devices, with the primary requirement being that it generate a signal which is proportional to input torque to the transmission and provide a reversible signal with reversing torque direction. Examples of suitable devices are a signal from a strain gauge associated with the torque shaft, amperage from an electric drive motor or pressure and displacement signals from the hydraulic units V and F.

Symbolically, the bidirectional output is indicated by the + and − signs, indicating driving and braking signals, respectively, derived from the torque sensor 35. The output signal from the torque sensor is delivered through a line 36 to a typical analog device, indicated generally at 37, which converts the signal from the torque sensor 35 to a hydraulic pressure in either of signal lines 38 and 39 with the existence of a hydraulic pressure in line 38 indicating a driving torque signal from the torque sensor 35 and pressure in the line 39 indicating a braking torque signal from the torque sensor 35. As an example of the analog device 37, it can be an electro-hydraulic closed center four-way valve having a connection at 40 to a fluid pressure source and a connection to tank at 41. Such a valve receives an electrical signal through line 36 and, dependent upon the plus or minus nature thereof correspondingly positions the four-way valve to supply pressure from supply connection 40 to the appropriate one of the signal lines 38 and 39.

Means are provided for generating a torque demand signal and, more particularly, for selectively generating either of two torque demand signals, with one torque demand signal being for the driving mode and the second torque demand signal for the braking mode. These signals are generated by two similar torque demand generators, indicated at 45 and 46, respectively. The torque demand generator 45 is operable in a driving mode and has an operator pedal 47 operable to move a plunger 48 movably mounted in a casing 49 which, through a spring 50, acts on a valve member 51 which controls the connection of a signal line 52 to either a source 53 of fluid pressure or a tank line 54. In the position shown, the spools 55 and 56 of the valve member 51 block communication of the signal line with either pressure source or tank. When the operator depresses the pedal 47, the valve 51 shifts to the left whereby pressure fluid can flow through a passage 57 to the signal line 52, with the movement of the valve spool being opposed by a spring 58 and by pressure acting on the left-hand end of the valve member. After release of pedal 47, pressures in the signal line 52 and the spring 58 return the valve member to a position to the right of that shown in FIG. 1 to connect signal line 52 to the tank line 54 and, after release of pressure, the valve member reaches the closed position shown in FIG. 1.

The torque demand generator 46 has the pedal 47′ operable for torque demand generation in a braking mode and with the structure of the torque demand generator 46 being the same as that of the torque demand generator 45 and the same reference numerals being applied thereto with a prime affixed.

Operation of the valve member 55′ under control of the pedal 47′ determines the existence of a pressure in line 60. The signal lines 52 and 60 from the torque demand generators extend to a selector valve, indicated generally at 61, which selects either a driving or braking mode, as determined by which torque demand generator 45 or 46 has created a pressure signal in the corresponding signal lines 52 and 60. The selector valve 61 has a valve member 62 controlling delivery of fluid pressure to a governor valve, indicated generally at 63 through a pair of lines 64 and 65. The output from the governor valve 63 is to the control servo 17 through a directional control valve, indicated generally at 64.

The signal lines 52 and 60 from the torque demand generators separate into branches 70,71 and 72,73, respectively. Branch lines 71 and 73 control the position of the valve member 62 of the selector valve 61 to resultingly select the driving or braking mode. The branch lines 70 and 72 function to deliver the pressure signal to the selector valve, dependent upon which torque demand generator has been operated. The signal lines 38 and 39 from the analog device 40 also extend to the selector valve 61.

As shown in FIG. 1, a spring 75 urges the valve member 62 of the selector valve to a left-hand position when there is no hydraulic pressure in either of the branch lines 71 and 73. Assuming the pedal 47 associated with the torque demand generator 45 is operated to place the transmission in a driving mode, a hydraulic pressure is established in the signal line 52 which then exists in branch lines 70 and 71, with the result that the valve member 62 of the selector valve remains in the position shown. Pressure fluid from branch line 70 flows through the selector valve and through line 64 to an end of the governor valve to act against an end of a valve member 77 which is spring-urged to a center position by a pair of opposed springs 78 and 79. With the drive output 33 under load, there is then created an input torque to the transmission which is sensed by the torque sensor 35 and resultingly a control signal exists in line 38 which passes through the selector valve to line 65 leading to the governor valve and which is applied to an end of the valve 77 in opposition to the signal from the torque demand generator. The governor valve 63 has a pair of fluid pressure ports 80 and 81 and a center tank port 82. A pair of valve lands 83 and 84 of the valve 77 function in the neutral position of the valve member to block the pressure ports 80 and 81 from lines 85 and 86 which extend between the governor valve 63 and the directional control valve 64. When there is a difference in the pressures acting on opposite ends of the valve member 77 of the governor valve 63, there is resulting shift of the valve member 77. This shift results in pressure from one of pressure ports 80 and 81 extending to one of the lines 85 and 86 and being directed through the directional control valve 64 to the control servo 17. The line 85 has a branch 87 providing for two connections into the directional control valve 64.

The directional control valve 64, as shown, is positioned for operating the drive output 33, such as the wheels of a vehicle, in a forward direction and, in this position, a valve member 90 has a pair of valve spools 91 and 92 positioned whereby the line 86 communicates with a line 93 extending to the left-hand side of the control servo and the branch 87 of the line 85 communicates with a line 94 extending to the right-hand end of the control servo cylinder. When the directional control valve is positioned for causing reverse rotation of the output device 33, branch line 85 from the governor valve 63 communicates with the line 93 extending to the control servo and the line 86 from the governor valve communicates with the line 94 connected to the control servo.

As stated previously, assuming the pedal 47 has been depressed to cause the torque demand generator 45 to deliver a pressure signal to branch lines 70 and 71, the pressure in branch line 70 extends to the left-hand end of the governor valve and urges the valve member 77 to the right. This valve member is also sensitive to the input torque signal from the analog device delivered to the right-hand end of the valve member 77. If these pressures are equal, the valve member 77 remains in the position shown and no control signal is delivered through the directional control valve 64 to the control servo 17. Upon start-up, with there being no torque sensed by torque sensor 35, the pressure signal from the driving mode torque demand generator flows through the valves to the governor valve and causes shift thereof whereby pressure is delivered through line 87 and line 94 to the right-hand end of the control servo 17 to shift the piston 18 which moves the swash plate 15 to a position to cause forward operation of the transmission. As the input torque builds up in response to load, there is a control signal in line 38 which passes to the right-hand end of the governor valve and acts in opposition to the torque demand generated signal and, when these signals are in balance, the valve member 77 of the governor valve is in a modulating position to maintain the swash plate position. When there is an imbalance in the signals applied to opposite ends of the valve member of the governor valve, there is resultingly a change in the position of the swash plate 15 to adjust the ratio of the transmission until the imposed demand level of torque is achieved.

In a braking mode, the pedal 47' is operated to generate a signal in signal line 60 which, in acting through branch line 73, shifts the valve member 62 of the selector valve toward the right whereby pressure in branch line 72 can extend to the right end of the governor valve through the line 65 and the input torque signal in line 39 extending from the analog device 40 can pass through line 64 to the left end of governor valve 63. An imbalance in the pressure signals causes corresponding positioning of the valve member 77 to selectively control the delivery of pressure from one of pressure ports 80 or 81 to the control servo 17.

In order to limit maximum value of the first and second torque demand signals for driving and braking modes, respectively, each of the stems 48 and 48' has a stop member 100 and 101, respectively, rotatably adjustably mounted on a threaded end of the stem to be positioned for engagement with the righthand ends of the demand generator casings 49 and 49', respectively.

With the input torque control disclosed herein, the torque control senses prime mover output torque level and compares it with an imposed torque demand signal from one or the other of the torque demand generators 45 and 46, using any error existing therebetween to adjust the ratio of the transmission until the imposed demand level is achieved. The demand signal from either of the torque demand generators can be programmed to a predetermined schedule, dependent on time, speed, distance, acceleration rate, or maximum efficiency and, by use of the adjustable stops 100 and 101, the imposed demand signal level can be limited to place a limitation on the maximum torque that can be achieved. The control provides for proportioning the torque and, thus, the horsepower of the prime mover in response to an operator torque demand signal. Normal driving and braking operation is achieved through control only of the transmission ratio with torque-dependent horsepower signals. The control separates torque from prime mover speed and controls only torque, while allowing speed of the prime mover to remain fixed.

INDUSTRIAL APPLICABILITY

With the input torque control for a variable displacement hydraulic transmission, as disclosed herein, it is possible to change the transmission ratio of the transmission as output speed and torque requirements vary and with the transmission ratio change being sensitive to the output torque of the prime mover to prevent an overload condition thereof. The torque control provides for sensing of the prime mover output torque level and comparing it to an imposed torque demand signal and using the error therebetween to adjust the ratio of the transmission and without any control upon the speed of the prime mover which can be a fixed speed device, such as an electric motor.

We claim:

1. A torque control for a drive system having a fixed speed prime mover connected to a hydraulic transmission which can perform in driving and braking modes and having a pair of interconnected hydraulic displacement devices with at least one of said devices having variable displacement comprising, means for generating a torque signal representative of prime mover output torque which is the input torque to the hydraulic transmission, torque demand generating means for generating a first torque demand signal for a driving mode and a second torque demand signal for a braking mode, means for comparing the prime mover output torque signal and a torque demand signal and generating a control signal, and means responsive to said control signal for controlling displacement of the variable displacement device to eliminate any difference in said compared torque signals in both driving and braking modes of operation of said hydraulic transmission.

2. A control as defined in claim 1 including means for limiting maximum torque.

3. A torque control as defined in claim 1 wherein said means for generating a torque signal provides a positive signal in a driving mode or a negative signal in the braking mode of operation, and said torque demand generating means includes a first torque demand generator for the driving mode, and a second torque demand generator for the braking mode.

4. A torque control as defined in claim 3 wherein said comparing means includes means acted upon in opposition by a torque demand signal and the prime mover torque signal to generate the control signal, said means for generating the prime mover torque signal has two output lines with one line for carrying the positive signal and the other line for carrying the negative signal, and a switching member responsive to operation of either of the first or second torque demand generators to deliver a torque demand signal from the first torque demand generator and the positive input torque signal to the comparing means in the driving mode and a torque demand signal from the second torque demand generator and the negative input torque signal to the comparing means in a braking mode.

5. A control as defined in claim 4 wherein said torque demand generators include movable members and adjustable stops to limit movement of said members and thereby limit maximum torque.

6. An input torque control for a variable displacement hydraulic transmission having a variable displacement pump and an hydraulic motor driven thereby which can perform in driving and braking modes comprising, means for generating an input torque signal representative of input torque and which can be either a positive signal in a driving mode or a negative signal in the braking mode of operation, selectively operable means for generating a first torque demand signal for the driving mode, selectively operable means for generating a second torque demand signal for the braking mode, means for comparing whichever one of the torque demand signals that is generated with the input torque signal and generating a control signal in response to any difference therebetween for changing pump displacement to eliminate said difference.

7. An input torque control as defined in claim 6 wherein said comparing means includes means acted upon in oppositon by a torque demand signal and the input torque signal to generate the control signal, said means for generating an input torque signal has two output lines with one line for carrying the positive signal and the other line for carrying the negative signal, and a switching member responsive to operation of either of the first or second torque demand signals to deliver the first torque demand signal and the positive input torque signal to the comparing means in the driving mode and the second torque demand signal and the negative input torque signal thereto in a braking mode.

8. An input torque control as defined in claim 6 including means for limiting maximum value of said first and second torque demand signals.

9. An input torque control for a drive system having a fixed speed prime mover connected to a hydrostatic transmission which can perform in driving and braking modes and having a pair of hydraulically-connected displacement devices with at least one of said devices having variable displacement comprising, means f or generating an input torque signal representative of input torque to the transmission and which can be either a positive signal in a driving mode or a negative signal in the braking mode and having two output lines with one line for carrying the positive signal and the other line for carrying the negative signal, means for generating a first torque demand signal for the driving mode, means for generating a second torque demand signal for the braking mode, comparing means acted upon in opposition by a torque demand signal and the input torque signal in one of said output lines to generate a control signal in response to any difference therebetween for changing pump displacement to eliminate said difference, a switching member responsive to operation of either of the first or second torque demand signals to deliver the first torque demand signal and the positive input torque signal in said one line to the comparing means in the driving mode and the second torque demand signal and the negative input torque signal in said other line to the comparing means in a braking mode, and means for limiting the maximum value of said first and second torque demand signals.

10. An input torque control for a drive system having a hydraulic transmission operable by a prime mover and which can perform in driving and braking modes and having a pair of hydraulically-connected displacement devices with at least one of said devices having variable displacement comprising, means for generating an input torque signal representative of input torque to the transmission and which can be either a positive signal in a driving mode or a negative signal in the braking mode, means for generating a first torque demand signal for the driving mode, means for generating a second torque demand signal for the braking mode, comparing means acted upon in opposition by a torque demand signal and the input torque signal to generate a control signal in response to any difference therebetween for changing pump displacement to eliminate said difference, and a switching member responsive to operation of either of the first or second torque demand signals to deliver the first torque demand signal and the positive input torque signal to the comparing means in the driving mode and the second torque demand signal and the negative input torque signal to the comparing means in a braking mode.

* * * * *